United States Patent
Stenmark et al.

(10) Patent No.: US 8,054,966 B2
(45) Date of Patent: Nov. 8, 2011

(54) ECHO CANCELLATION AND NOISE REDUCTION ADAPTATION DURING RINGING SIGNAL PLAYBACK

(75) Inventors: Fredrik Stenmark, Malmö (SE); Per Hiselius, Lund (SE); Stefan Gustavsson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1322 days.

(21) Appl. No.: 11/490,528

(22) Filed: Jul. 21, 2006

(65) Prior Publication Data
US 2008/0043999 A1    Feb. 21, 2008

(51) Int. Cl.
*H04M 9/08* (2006.01)
(52) U.S. Cl. ........... 379/406.1; 379/406.05; 379/406.11; 379/406.12
(58) Field of Classification Search . 379/406.01–406.16
See application file for complete search history.

(56) References Cited

U.S. PATENT DOCUMENTS

| 5,007,046 A * | 4/1991 | Erving et al. ............... 370/249 |
| 5,400,399 A * | 3/1995 | Umemoto et al. ....... 379/406.08 |
| 2004/0264686 A1 * | 12/2004 | Enzner ..................... 379/406.08 |

FOREIGN PATENT DOCUMENTS

| JP | 64-50655 | 2/1989 |
| WO | WO 97/45995 | 12/1997 |

OTHER PUBLICATIONS

International Search Report mailed on Apr. 24, 2007 for corresponding PCT Application No. PCT/IB2007/050178.
International Preliminary Report on Patentability dated Jul. 22, 2008 issued in corresponding international application No. PCT/IB2007/050178, 6 pages.

* cited by examiner

*Primary Examiner* — Fan Tsang
*Assistant Examiner* — Ibraham Sharifzada
(74) *Attorney, Agent, or Firm* — Snyder, Clark, Lesch & Chung, LLP

(57) ABSTRACT

A communication device is provided that includes a speaker for outputting a ringing signal, a microphone for receiving the ringing signal, and logic configured to analyze the spectral content of the received ringing signal and adjust noise reduction parameters and echo cancellation parameters based on the analyzed spectral content of the received ringing signal.

11 Claims, 6 Drawing Sheets

ECHO CANCELLATION AND NOISE REDUCTION ADAPTATION DURING RINGING SIGNAL PLAYBACK

TECHNICAL FIELD OF THE INVENTION

The invention relates to communication devices, and more particularly, to echo cancellation and noise reduction in communication devices.

DESCRIPTION OF RELATED ART

Communication devices, such as mobile terminals, may be used by individuals for communicating with users of other communication devices. For example, a communication device may be used to place/receive calls to/from other communication devices. Communication devices typically contain microphones and speaker systems that allow the user to receive and transmit audio communications. The microphone and speaker systems may include echo cancellation and noise reduction mechanisms to reduce undesirable echo or noise effects. These mechanisms may include adjustable parameters that are used to tune the mechanisms for a particular session. It is desirable to effectively and quickly adjust these echo cancellation and noise reduction parameters in communications devices.

SUMMARY

According to one aspect, a method comprises outputting a ringing signal through a speaker; receiving the ringing signal through a microphone; and adjusting echo cancellation parameters based on analyzed spectral content of the received ringing signal.

Additionally, the echo cancellation parameters include a filter step size.

Additionally, the ringing signal indicates an incoming call.

Additionally, the echo cancellation parameters are adjusted before the incoming call is answered.

Additionally, the echo cancellation parameters continue to be adjusted during the call.

Additionally, noise reduction parameters are adjusted based on analyzed spectral content of the received ringing signal.

According to another aspect, a communication device is provided. The communication device comprises: a speaker for outputting a ringing signal; a microphone for receiving the ringing signal; and logic configured to: analyze a spectral content of the received ringing signal; and adjust echo cancellation parameters based on the analyzed spectral content of the received ringing signal.

Additionally, the logic includes a filter.

Additionally, the adjusting the echo cancellation parameters includes changing a filter step size.

Additionally, the echo cancellation parameters are adjusted before a call is answered.

Additionally, the echo cancellation parameters continue to be adjusted during the call while a user is speaking.

Additionally, noise reduction parameters are adjusted based on analyzed spectral content of the received ringing signal.

According to another aspect, a method is provided. The method comprises outputting a ringing signal through a speaker; receiving signals including the ringing signal through a microphone; subtracting known spectral content of the ringing signal from spectral contents of the received signals through the microphone; analyzing the spectral content of a signal remaining after the subtracting; and adjusting noise reduction parameters based on the analyzed spectral content of the remaining signal.

Additionally, adjusting the noise reduction parameters includes adjusting a filter step size.

Additionally, the ringing signal indicates an incoming call.

Additionally, adjusting the noise reduction parameters includes adjusting the noise reduction parameters before a user answers the call.

Additionally, adjusting the noise reduction parameters includes adjusting filter coefficients.

According to another aspect, a communication device is provided. The communication device comprises: a speaker for outputting a ringing signal; a microphone for receiving signals including the ringing signal; and logic configured to: subtract a spectral content of the ringing signal from the spectral contents of the received signals through the microphone; analyze a spectral content of a remaining signal after the subtracting; and adjust noise reduction parameters based on the analyzed spectral content of the remaining signal.

Additionally, the signals received through the microphone include background noise.

Additionally, the noise reduction parameters include a filter step size.

Additionally, the filter step size is based on the analyzed spectral content of the remaining signal.

Additionally, the ringing signal indicates an incoming call

According to another aspect, a method is provided. The method comprises, analyzing spectral content of a received ringing signal; and adjusting echo cancellation and noise cancellation parameters based on the analyzed spectral content of the received ringing signal.

Additionally, adjusting the echo cancellation and the noise reduction parameters includes changing a filter step size.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

Exemplary Communication Device

Figure 1:
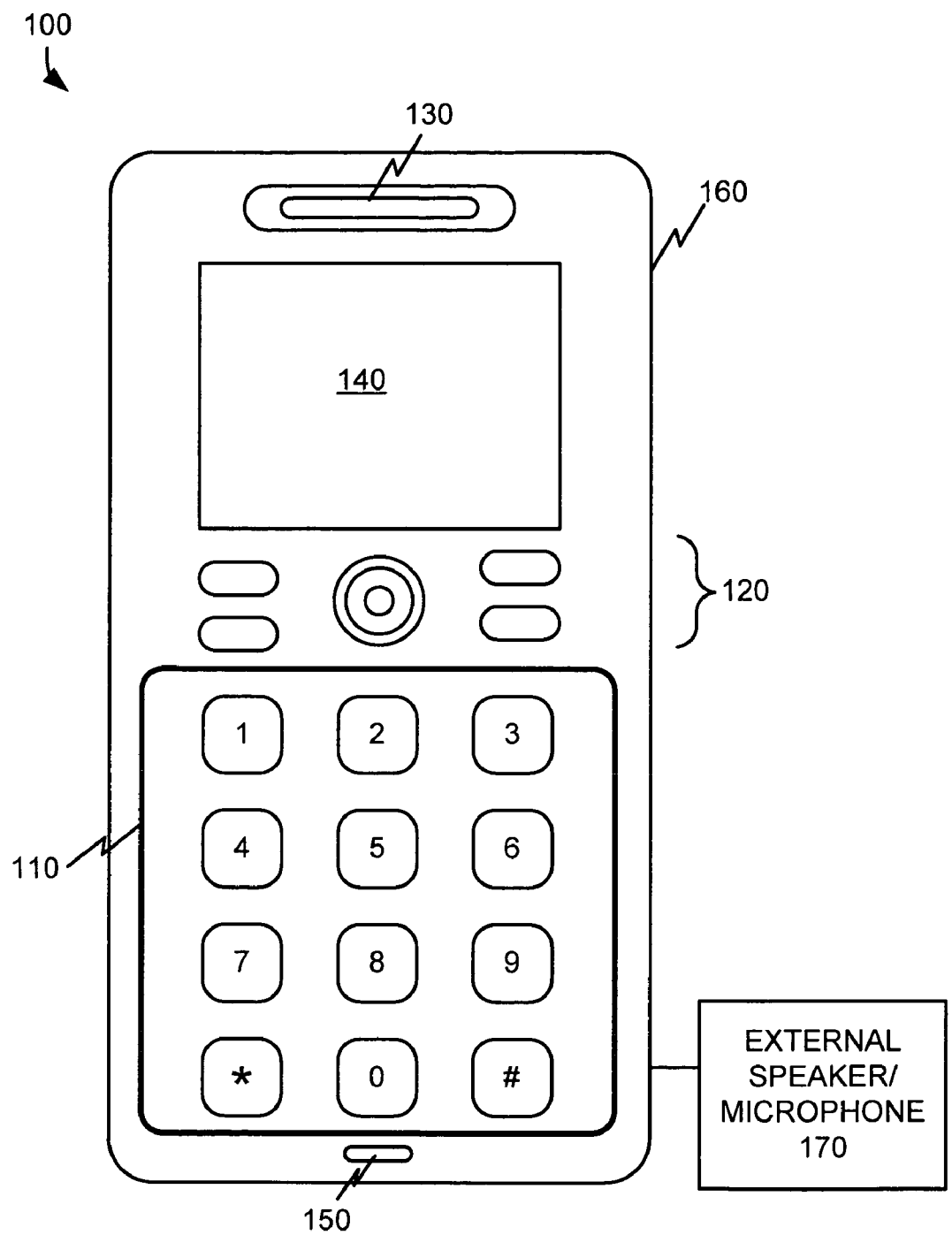
FIG. 1 is a diagram of an exemplary implementation of a communication device.

FIG. 1 is a diagram of an exemplary implementation of a communication device. Communication device 100 (hereinafter communication device 100) may be a mobile communication device. As used herein, a "communication device"

and/or "communication terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; a laptop; a palmtop receiver and/or another type of communication device.

Communication device 100 may include housing 160, keypad 110, control keys 120, speaker 130, display 140, and microphone 150. Housing 160 may include a structure configured to hold devices and components used in communication device 100. For example, housing 160 may be formed from plastic, metal, or composite and may be configured to support keypad 110, control keys 120, speaker 130, display 140 and microphone 150.

Keypad 110 may include devices and/or logic that can be used to operate communication device 100. Keypad 110 may further be adapted to receive user inputs, directly or via other devices, such as a stylus for entering information into communication device 100. In one implementation, communication functions of communication device 100 may be controlled by activating keys in keypad 110. Implementations of keys may have key information associated therewith, such as numbers, letters, symbols, etc. The user may operate keys in keypad 110 to place calls, enter digits, commands, and text messages, into communication device 100. Designated functions of keys may form and/or manipulate images that may be displayed on display 140.

Control keys 120 may include buttons that permit a user to interact with communication device 100 to cause communication device 100 to perform specified actions, such as to interact with display 140, etc.

Speaker 130 may include a device that provides audible information to a user of communication device 100. Speaker 130 may include multiple speakers that may be located anywhere on communication device 100, where one speaker may function, for example, as an earpiece when a user communicates using communication device 100. Speaker 130 may also include a digital to analog converter to convert digital signals into analog signals. Speaker 130 may also function as an output device for a ringing signal indicating that an incoming call is being received by communication device 100.

Display 140 may include a device that provides visual images to a user. For example, display 140 may provide graphic information regarding incoming/outgoing calls, text messages, games, phonebooks, the current date/time, volume settings, etc., to a user of communication device 100. Implementations of display 140 may be implemented as black and white or color flat panel displays.

Microphone 150 may include a device that converts speech or other acoustic signals into electrical signals for use by communication device 100. Microphone 150 may also include an analog to digital converter to convert inputted analog signals into digital signals. Microphone 150 may be located anywhere on communication device 100 and may be configured, for example, to convert spoken words or phrases into electrical signals for use by communication device 100.

Communication device 100 may allow an external speaker and/or microphone 170 to be connected to it. For example, a user may use an external speaker or microphone 170 that connects via a wireless Bluetooth connection. External speaker/microphone 170 may be used in place of speaker 130 and may be connected to communication device 100. External speaker 170 may function, for example, as a loudspeaker, or as an earpiece when a user communicates using communication device 100. External speaker 170 may function as an output device for a ringing signal indicating that an incoming call is being received by communication device 100.

Figure 2:
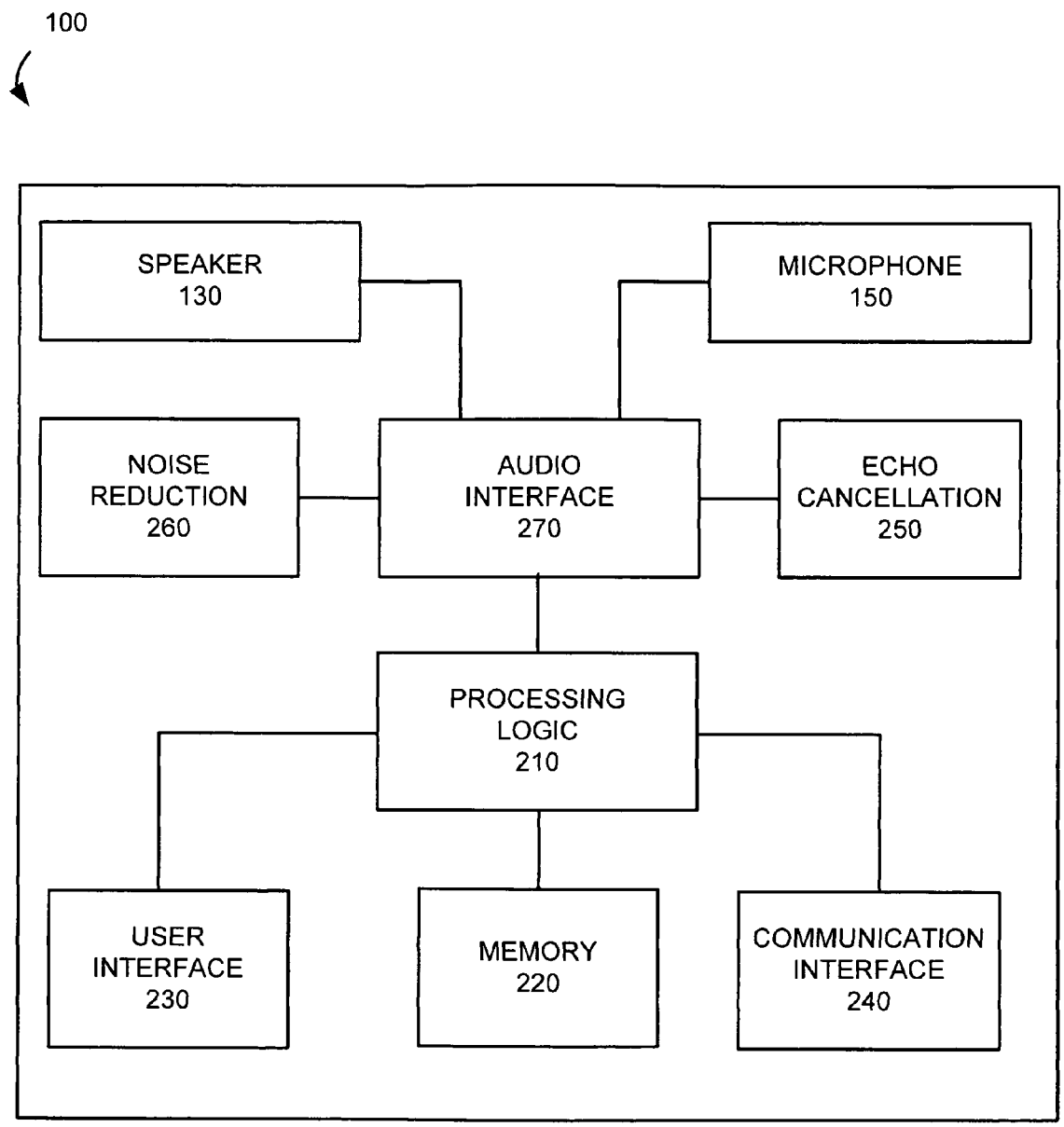
FIG. 2 illustrates an exemplary functional diagram of the communication device of FIG. 1.

FIG. 2 illustrates an exemplary functional diagram of a communication device, such as communication device 100, consistent with the invention. As shown in FIG. 2, communication device 100 may include speaker 130, microphone 150, processing logic 210, memory 220, user interface 230, communication interface 240, echo cancellation module 250, noise reduction module 260, and audio interface 270.

Processing logic 210 may include a processor, microprocessor, an application specific integrated circuit (ASIC), field programmable gate array (FPGA), or the like. Processing logic 210 may include data structures or software programs to control operation of communication device 100 and its components. Implementations of communication device 100 may use an individual processing logic component or multiple processing logic components, such as processing logic components operating in parallel. As will be described below, processing logic 210 may receive inputs relating to signals for controlling processing of echo cancellation and noise reduction within communications device 100.

Memory 220 may include a random access memory (RAM), a read only memory (ROM), and/or another type of memory to store data and instructions that may be used by processing logic 210. Memory 220 may also contain data structures relating to noise reduction and echo cancellation processes in accordance with the invention.

User interface 230 may include mechanisms, such as hardware and/or software, for inputting information to communication device 100 and/or for outputting information from communication device 100, such as display 140 and keypad 110.

Communication interface 240 may include, for example, a transmitter that may convert base band signals from processing logic 210 to radio frequency (RF) signals and/or a receiver that may convert RF signals to base band signals. Alternatively, communication interface 240 may include a transceiver to perform functions of both a transmitter and a receiver. Communication interface 240 may connect to an antenna assembly (not shown) for transmission and reception of the RF signals. Antenna assembly may include one or more antennas to transmit and receive RF signals over the air. Antenna assembly may receive RF signals from communication interface 240 for transmitting over the air, and receive RF signals over the air for conveying to communication interface 240.

Echo cancellation module 250 may include mechanisms, such as hardware and/or software, for storing, receiving, analyzing and adjusting signals and parameters relating to echo cancellation within communication device 100, consistent with the invention. Echo cancellation module 250 may send and receive signals and parameters to/from audio interface 270. For example, echo cancellation module may send audio interface 270 a filter step size parameter and/or filter coefficients used to adjust a filter contained in audio interface 270.

Noise reduction module 260 may include mechanisms, such as hardware and/or software, for storing, receiving, analyzing and adjusting signals and parameters relating to noise reduction within communication device 100 consistent with the invention. Noise reduction module 260 may send and receive signals and parameters to/from audio interface 270. For example, noise reduction module 260 may send audio interface 270 a filter step size parameter and/or filter coefficients used to adjust a filter for noise reduction processing contained in audio interface 270.

Audio interface 270 may include filters and signal processing devices for performing echo cancellation and noise reduction processes. For example, audio interface 270 may adjust signals to speakers 130 and 170, and may adjust signals from microphone 150 for echo cancellation and noise reduction processes. Audio interface 270 may also for example, receive and transmit signals to/from processing logic 210, echo cancellation module 250 and noise reduction module 260 in order to allow communications between the modules to perform echo cancellation and noise reduction processes in accordance with the invention.

As will be described in detail below, communication device 100, may perform certain operations relating to dynamically adjusting parameters relating to echo cancellation and noise reduction in response to instructions associated with processing logic 210. Communication device 100 may perform such operations in response to processing logic 210 executing software instructions contained in a computer-readable medium, such as memory 220. A computer-readable medium may be defined as a physical or logical memory device and/or carrier wave.

The software instructions may be read into memory 220 from another computer-readable medium or from another device via communication interface 240. The software instructions contained in memory 220 may cause processing logic 210 to perform processes that will be described later. Alternatively, hardwired circuitry may be used in place of or in combination with software instructions to implement processes consistent with the invention. Thus, implementations consistent with the principles of the invention are not limited to any specific combination of hardware circuitry and software.

Figure 3:
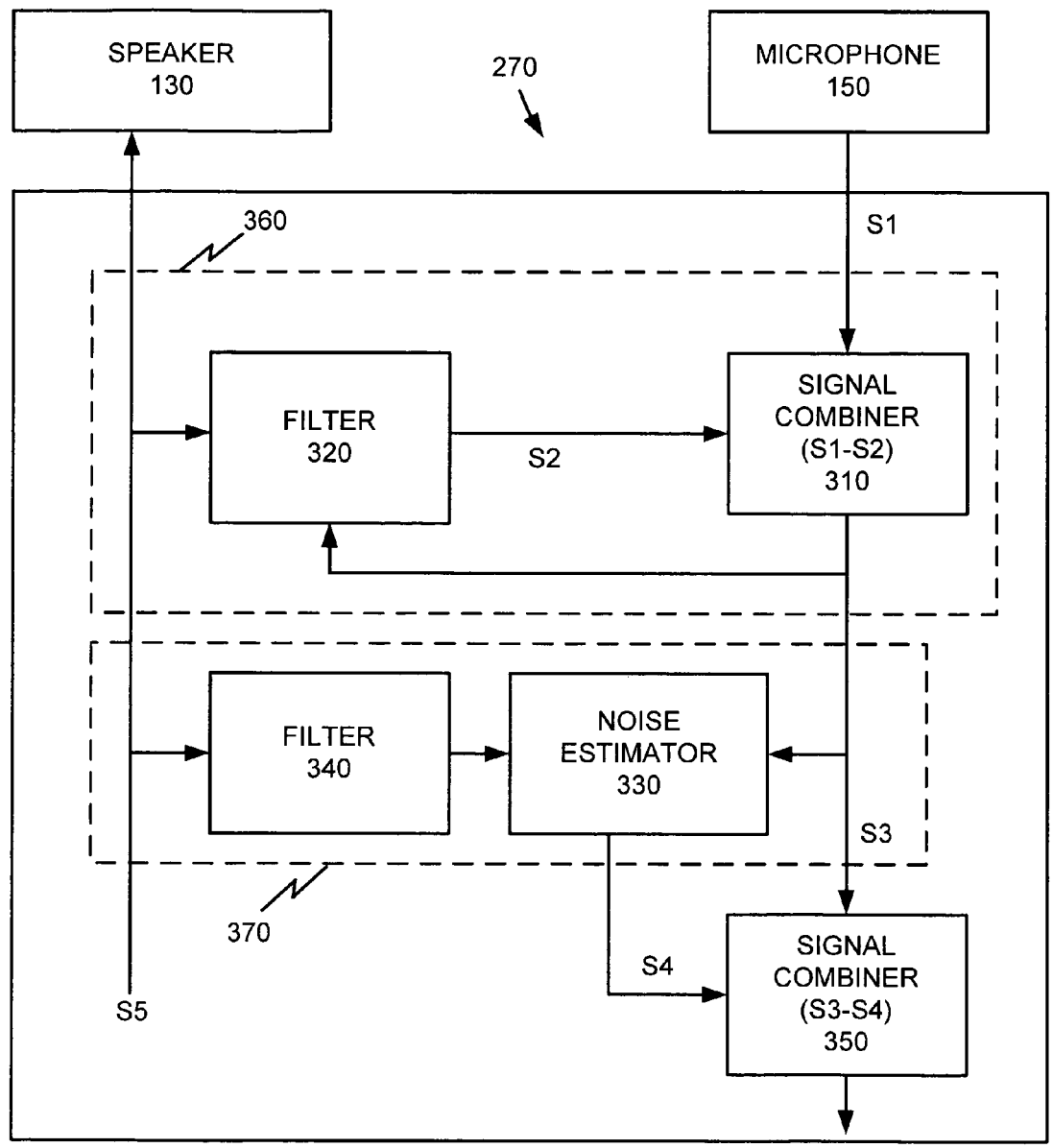
FIG. 3 illustrates an exemplary audio interface.

FIG. 3 illustrates an exemplary diagram of audio interface 270. As shown in FIG. 3, speaker 130 and microphone 150 may be connected to audio interface 270. Audio interface 270 may include signal combiner 310, filter 320, noise estimator 330, filter 340 and signal combiner 350. Signal combiner 310 and filter 320 may be included in echo canceling portion 360 of audio interface 270. Noise estimator 330 and filter 340 may be included in noise reduction portion 370 of audio interface 270. External speaker 170 may also be connected to audio interface 270 in place of speaker 130, for example.

Signal combiner 310 may include mechanisms, such as hardware and/or software, for receiving signals and adding/subtracting the received signals. Signal combiner 310 may receive signals from microphone 150 and filter 320. In one implementation, signal combiner 310 subtracts signal S2 (received from filter 320) from signal S1 (received from microphone 150). In this implementation, signal S2 may represent detected echoes which are subtracted from signal S1. This may produce an output signal (S3) from signal combiner 310 that has cancelled all echoes.

Filter 320 may be an adaptive type of filter that may include mechanisms, such as hardware and/or software, for filtering received signals. For example, a signal S5 (such as a signal received over antenna) may be modified based on a LMS (least mean square) algorithm and then may be output. Filter 320 may receive a filter step size parameter from echo cancellation module 250 that may be used to calculate filter coefficients and adjust the performance of filter 320. For example, the filter step size parameter may also determine the speed at which filter 320 may converge to a solution for optimum performance. Filter 320 may receive signals S5 and S3 and output a filtered signal S2 based on the filter coefficients.

Noise estimator 330 may include mechanisms, such as hardware and/or software, for receiving signals and estimating noise. For example, noise estimator 330 may store information and parameters relating to noise reduction. Noise estimator 330 may receive signals from microphone 150 and from filter 340 in order to output signals (S4) relating to estimated noise.

Filter 340 may include mechanisms, such as hardware and/or software, for filtering received signals. For example, filter 340 may receive a signal S5, also sent to speaker 130, for filtering. For example, an input signal S5 may be modified based on the filter coefficients and then may be output. Filter 340 may also receive a filter step size parameters and/or filter coefficients from noise reduction module 260 used to adjust the performance of filter 340. In some implementations, filter 340 may be an adaptive type of filter that may receive a filter step size parameter from noise reduction module 260, and in other implementations, filter 340 may receive filter coefficients from noise reduction module 260, for example.

Signal combiner 350 may include mechanisms, such as hardware and/or software, for receiving signals and adding/subtracting the received signals. In one implementation, for example, signal combiner 350 subtracts signal S4 output from noise estimator 330, from signal S3, received from signal combiner 310. In this implementation, signal S4 may compensate for detected noise so is may be subtracted from signal S3 by signal combiner 350. This may produce an output signal from signal combiner 350 that has reduced noise.

Exemplary Processing

Figure 4:
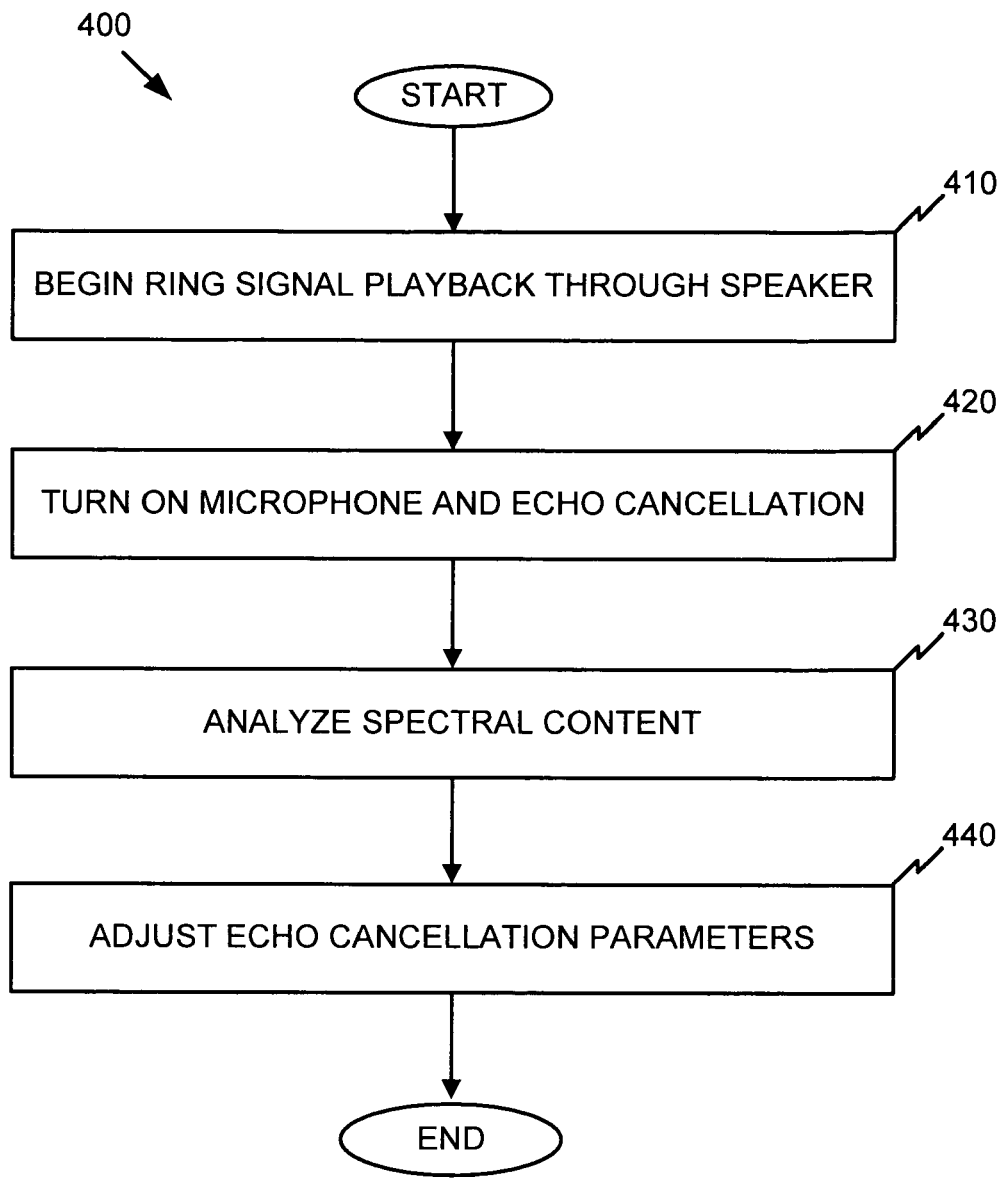
FIG. 4 illustrates an exemplary flow diagram of echo cancellation.

FIG. 4 is a flowchart of an exemplary process 400 for performing echo cancellation. The exemplary process may begin when a call is received by the communication device 100. The incoming call instigates a ringing signal to be supplied or played back through speaker 130 or external speaker 170 of communication device 100 (act 410). While the ringing signal is being played through speaker 130, the microphone 150 may be turned on along with the echo cancellation module 250 (act 420). For example, the microphone 150 may transmit electrical signals received from either speaker 130 or 170, to be used by the echo cancellation module 250 to begin echo cancellation processes. The spectral content of the signals received by microphone 150 may then be analyzed (act 430) in echo cancellation module 250. Using the received and analyzed signals, the echo cancellation parameters may be adjusted by echo cancellation module 250 (act 440). For example, echo cancellation parameters such as the appropriate filter step size parameter used to adjust filter 320 may be stored in module 250 and transmitted to filter 320 based on the analyzed signals. For example, the filter step size may be used to calculate filter coefficients and allow the filter 320 to quickly converge to a solution for optimum performance. In other implementations, for example, if a user answers an incoming call, echo cancellation parameters may continue to be adjusted (act 440) using and analyzing (act 430) the spectral content of signals received from speakers 130 or 170, while a user of communication device 100 is speaking into microphone 150. In other implementations of the invention, the echo cancellation process of FIG. 4 may be performed at any time desired by the user, without communication device 100 receiving an incoming call to instigate the process.

Figure 5:
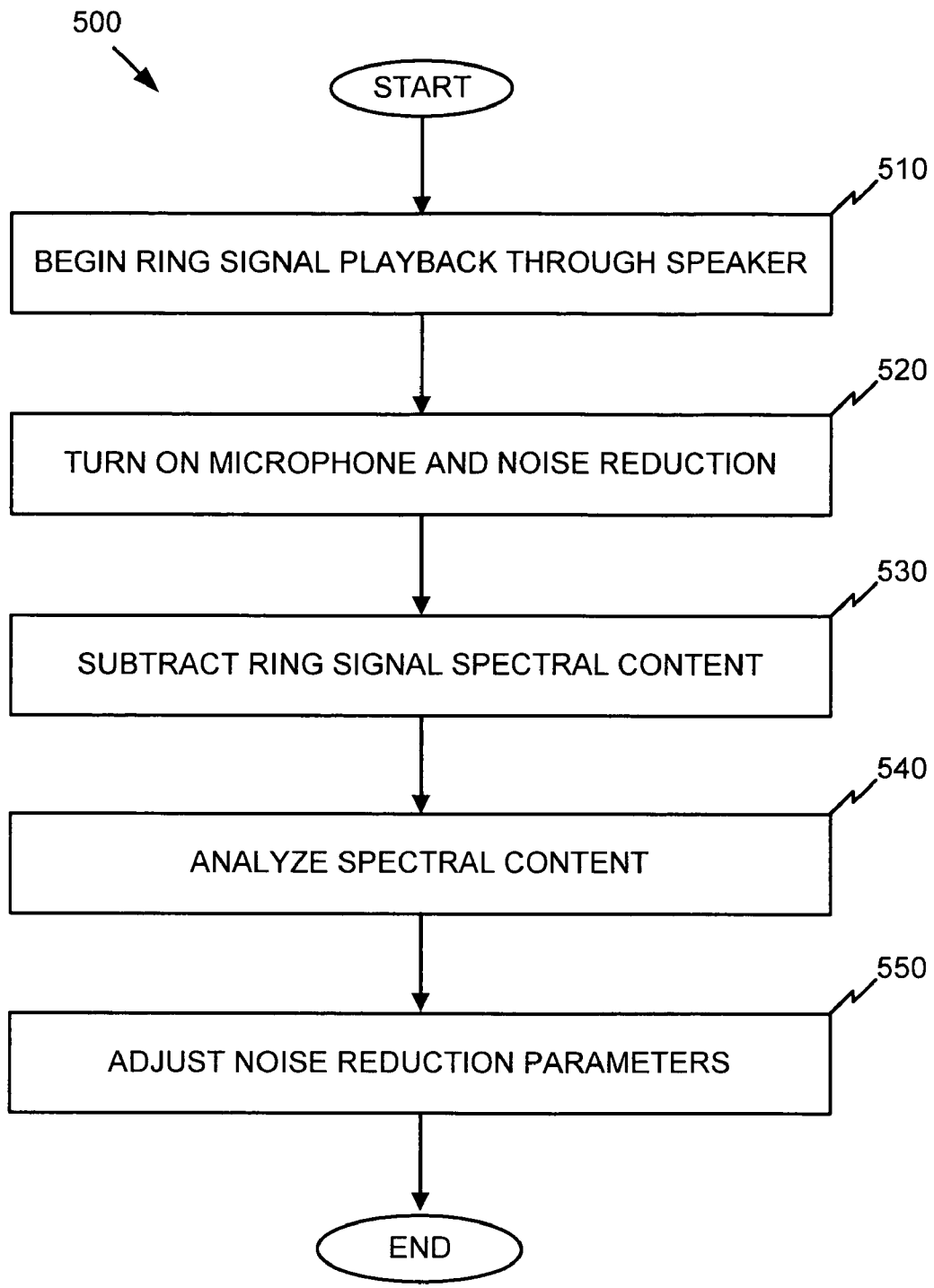
FIG. 5 illustrates an exemplary flow diagram of noise reduction.

FIG. 5 is a flowchart of an exemplary process 500 for performing noise reduction. The exemplary process may begin when an incoming call instigates a ringing signal to be supplied or played back through speaker 130 of communication device 100 (act 510). While the ringing signal is being played through speaker 130, the microphone 150 is turned on along with the activation of noise reduction module 260 (act 520). For example, the microphone 150 may transmit electrical signals received from speaker 130, to be used by the noise reduction module 260 to begin noise reduction analysis and correction. Because the spectral content of the supplied ringing signal is known ahead of time, it may be subtracted out from the signals received from microphone 150 by noise reduction module 260 (act 530). The remaining spectral content of the signals, that may include background noise received by microphone 150, may then be analyzed (act 540). Using the analyzed signals, noise reduction parameters may be adjusted by noise reduction module 260 (act 550). For example, noise reduction parameters such as a filter step size parameter and/or filter coefficients used to adjust filter 340 may be adjusted and transmitted from module 260 to filter 340 in act 550. For example, in one implementation, if filter 340 is an adaptive type of filter, a filter step size parameter may be transmitted from module 260 and in another implementation, filter 340 may receive filter coefficients from module 260.

In other implementations of the invention, for example, if a user answers an incoming call, noise reduction parameters may continue to be adjusted using the exemplary process as shown in FIG. 5 without performing act 530. For example, as a user has answered a call, there may be no ringing signal, and therefore the spectral content of the ringing signal may not need to be subtracted from the signals received by microphone 150. In this implementation, analyzing the spectral content of signals received through microphone (act 540) for noise reduction purposes may include analyzing the ambient background noise when a user of communication device 100 may not be speaking into microphone 150.

In still further implementations of the invention, for example, the noise reduction process of FIG. 5 may be performed at any time desired by the user, without communication device 100 receiving an incoming call to instigate process 500.

Figure 6:
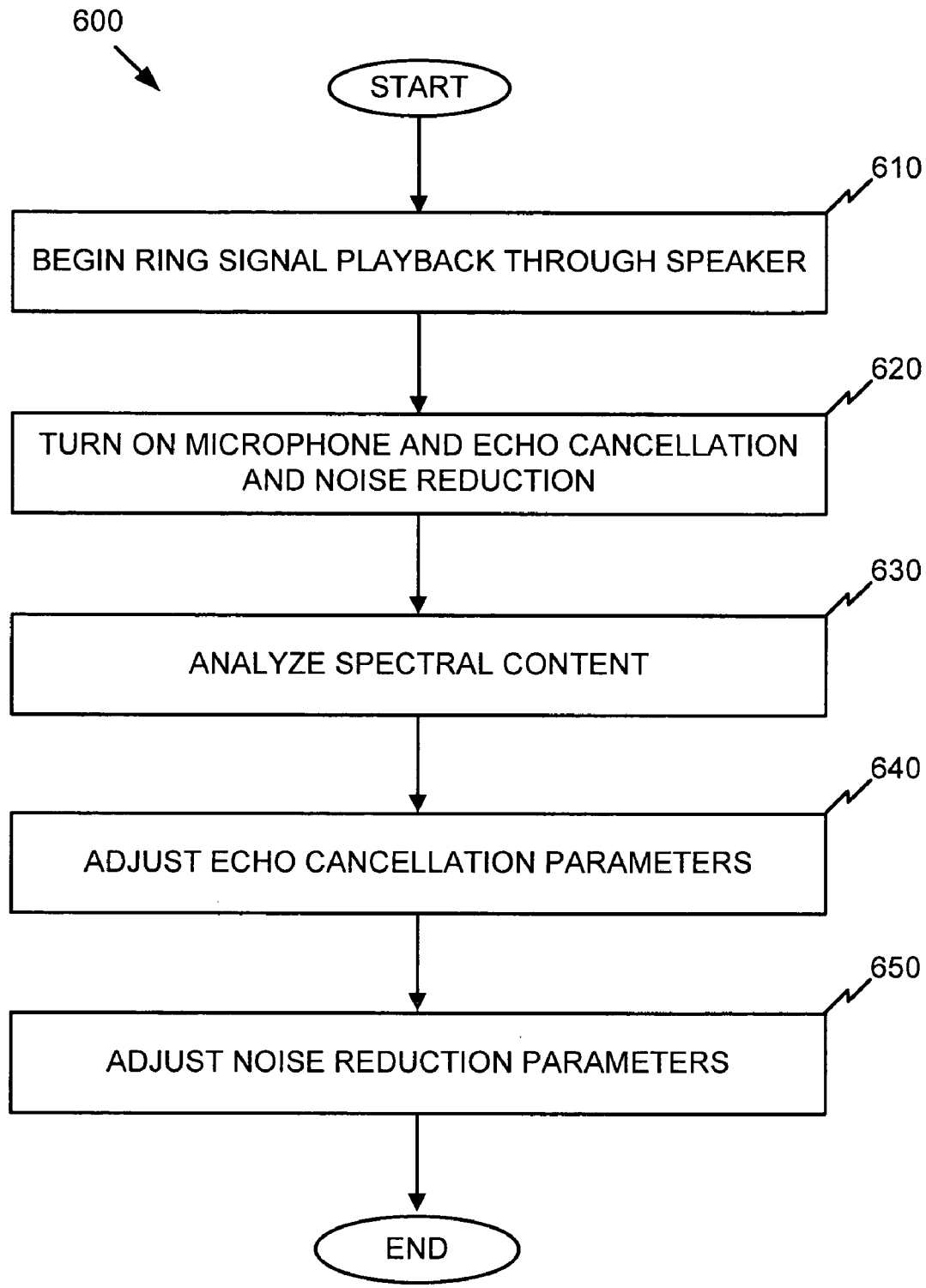
FIG. 6 illustrates an exemplary flow diagram of echo cancellation and noise reduction.

FIG. 6 is a flowchart of an exemplary process 600 for performing echo cancellation and noise reduction processing. The exemplary process may begin when an incoming call instigates a ring signal to be supplied or played back through speakers 130 or 170 of communication device 100 (act 610). While the ring signal is being played through speaker 130, the microphone 150 is turned on along with the activation of both echo cancellation and noise reduction modules 250 and 260 respectively (act 620). For example, the microphone 150 may transmit electrical signals received from speaker 130, to be used by the noise reduction algorithm to begin noise reduction processes. The spectral content of the signals received by microphone 150 may then be analyzed by both the echo cancellation and noise reduction modules 250 and 260 (act 630). Using the received and analyzed signals, the echo cancellation parameters may be adjusted by echo cancellation module 250 (act 640). The process may continue by adjusting the noise reduction parameters in module 260 (act 650). For example, a filter step size parameter may be adjusted in module 250 and transmitted to filter 320 for echo cancellation purposes (act 640). In one implementation, filter coefficients for filter 340 may be calculated in noise reduction module 260 based on a filter step size parameter transmitted from echo cancellation module 250. The filter coefficients calculated in noise reduction module 260 may then be transmitted to filter 340 for noise reduction purposes (act 650). In this example, the filter coefficients in filters 320 and 340 may therefore be identical. In other implementations, filter step size parameters and/or filter coefficients may be calculated in noise reduction module 260 independently of echo cancellation module 250.

In other implementations, if a user answers an incoming call, echo cancellation and noise reduction parameters may continue to be adjusted (acts 640 and 650) while the user is speaking. In other implementations, the process of FIG. 6 may be performed at any time desired by the user, without communication device 100 receiving an incoming call to instigate process 600.

In other implementations, a training signal may also be stored and used by communication device 100 to generate a signal to playback through speakers 130 or 170. This training signal may be customized to provide useful information to echo cancellation module 250 and noise reduction module 260, where modules may adjust filter parameters and/or filter coefficients based on the received signals. The adjusted filter parameters and/or filter coefficients may then be transmitted to filters 320 and 340. The training signal may be supplied to speaker 130 or to speaker 170 simultaneously with a ringing signal or separately without the ringing signal.

CONCLUSION

Implementations consistent with principles of the invention may provide echo cancellation and noise reduction processes within a communication device that are optimized based on a ring signal indicating an incoming call.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIGS. 4-6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving an incoming call;

outputting, in response to receiving the incoming call, a ringing signal through a speaker, where the ringing signal indicates receipt of the incoming call;

activating a microphone and an echo cancellation module in response to the output ringing signal;

receiving the ringing signal through the microphone;

transmitting the ringing signal to the echo cancellation module;

analyzing, by the echo cancellation module, spectral content of the ringing signal to adjust a filter step size of a first adaptive filter to calculate echo cancellation filter coefficients for the first adaptive filter;

transmitting the adjusted filter step size to the first adaptive filter;

filtering one or more signals by the first adaptive filter based on the adjusted filter step size to cancel an echo component included in the one or more signals;

transmitting the adjusted filter step size to a second adaptive filter;

calculating, by the second adaptive filter, noise reduction filter coefficients based on the adjusted filter step size with the same filter step size used to calculate the echo cancellation filter coefficients; and filtering the one or more signals by the second adaptive filter based on the calculated noise reduction filter coefficients to reduce a noise component included in the one or more signals.

2. The method of claim 1, where the echo cancellation filter coefficients are adjusted before the incoming call is answered.

3. The method of claim 2, where the echo cancellation filter coefficients continue to be adjusted during the call.

4. The method of claim 1, where the noise reduction filter coefficients continue to be adjusted during the call.

5. A communication device comprising:

a speaker for outputting a ringing signal, where the ringing signal indicates an incoming call; and a microphone for receiving the ringing signal and transmitting the ringing signal to an echo cancellation module, wherein the echo cancellation module is configured to:

analyze a spectral content of the received ringing signal to adjust a filter step size of a first adaptive filter to calculate echo cancellation filter coefficients for the first adaptive filter;

transmit the adjusted filter step size to the first adaptive filter;

transmit the adjusted filter step size to a second adaptive filter, wherein the first adaptive filter is configured to:

filter one or more signals based on the adjusted filter step size to cancel an echo component included in the one or more signals, wherein the second adaptive filter is configured to:

calculate noise reduction filter coefficients based on the adjusted filter step size with the same filter step size used to calculate the echo cancellation filter coefficients, and filter the one or more signals based on the calculated noise reduction filter coefficients to reduce a noise component included in the one or more signals.

6. The communication device of claim 5, where the echo cancellation filter coefficients are adjusted before a call is answered.

7. The communication device of claim 5, where the echo cancellation filter coefficients continue to be adjusted during the call while a user is speaking.

8. The communication device of claim 5, where the noise reduction filter coefficients are adjusted before the incoming call is answered.

9. A method comprising:

outputting a ringing signal through a speaker;

receiving signals including the ringing signal through a microphone;

analyzing spectral content of the received ringing signal; and determining, by an echo cancellation module, an adjusted filter step size based on the analyzed spectral content;

transmitting the adjusted filter step size to an echo canceling portion and a noise reduction portion of the communication device;

calculating, by a first adaptive filter included in the echo canceling portion, echo cancellation filter coefficients based on the adjusted filter step size;

filtering a received audio signal by the first adaptive filter based on the echo cancellation filter coefficients to cancel an echo component included in the received audio signal;

calculating, by a second adaptive filter included in the noise reduction portion, noise reduction filter coefficients based on a the adjusted filter step size; and filtering the audio signal by the second adaptive filter based on the calculated noise reduction filter coefficients to reduce a noise component included in the one or more signals.

10. The method of claim 9, where the ringing signal indicates an incoming call.

11. The method of claim 10, wherein calculating the noise reduction filter coefficients is performed before a user answers the incoming call.

* * * * *